United States Patent [19]

Ceynow et al.

[11] Patent Number: 5,440,880
[45] Date of Patent: Aug. 15, 1995

[54] DIESEL ENGINE EGR SYSTEM WITH EXHAUST GAS CONDITIONING

[75] Inventors: Kenneth P. Ceynow, Oak Lawn; Richard E. Jass, Frankfort; Robert X. Shi, Chicago, all of Ill.

[73] Assignee: Navistar International Transportation Corp., Chicago, Ill.

[21] Appl. No.: 243,022

[22] Filed: May 16, 1994

[51] Int. Cl.$^6$ ............................ F02B 33/44; F02B 47/08
[52] U.S. Cl. .................................... 60/605.2; 123/570
[58] Field of Search ................ 60/602, 605.2; 123/570

[56] References Cited

U.S. PATENT DOCUMENTS 5,205,265  4/1993  Kashiyama et al. .............. 60/605.2

FOREIGN PATENT DOCUMENTS 0039015  3/1977  Japan ............................ 60/605.2
0037318  2/1991  Japan ............................ 60/605.2
4103867  4/1992  Japan ............................ 60/605.2

OTHER PUBLICATIONS

"Self Cleaning Diesel Soot Filter Introduced" *Diesel Power Equipment* Apr. 1992, p. 23.

Primary Examiner—Richard A. Bertsch
Assistant Examiner—Charles G. Freay
Attorney, Agent, or Firm—Dennis K. Sullivan

[57] ABSTRACT

The exhaust gas recirculation system which includes a diverter valve system for selectively directing recirculated gas through an aftercooler includes a self regenerating catalyzed particulate filter which is positioned upstream of the aftercooler of the system to prevent soot from accumulating on the heat exchange surfaces of the aftercooler. Removal of the soot from the exhaust gas increases efficiency and longevity of the aftercooler.

12 Claims, 2 Drawing Sheets

DIESEL ENGINE EGR SYSTEM WITH EXHAUST GAS CONDITIONING

BACKGROUND OF THE INVENTION

The present invention relates to an exhaust gas recirculation system for a diesel engine which avoids creation of excessive intake manifold temperatures and reduces, if not altogether eliminates, soot in the recirculated exhaust gas.

THE PRIOR ART

Exhaust gas recirculation (EGR) is a well known NOx emission control technique for internal combustion engines. Under some engine conditions on a turbocharged diesel engine, the potential for NOx emission reduction through the use of EGR is limited, primarily due to the fact that exhaust gas recirculation increases intake manifold temperature. As intake manifold temperature increases above 300° F., the likelihood of an engine experiencing a problem with the power cylinder increases dramatically.

Many diesel engine manufacturers also employ aftercooling (air-to-water or air-to-air) as a way of reducing Nox emissions by reducing intake manifold temperatures. For lowest NOx emissions, intercooling and EGR can be combined. This combination has greater emissions reduction potential than either of the technologies alone as the EGR flow can be routed through the aftercooler, thereby lowering its temperature. This permits the use of EGR at engine operating conditions which previously had to be avoided due to excessive intake manifold temperatures. One problem with this combination, however, is the fouling of the aftercooler by soot in the engine exhaust. Over time, soot in the exhaust adheres to the heat transfer surfaces on the engine air side of the aftercooler, reducing cooler efficiency. In addition, buildup of this soot reduces effective flow area by causing a restriction to air flow.

As will be described in greater detail hereinafter, this problem is resolved by the system of the present invention, using a known engine emission exhaust aftertreatment device in a new way.

SUMMARY OF THE INVENTION

Accordingly, it is a primary object of the system of the present invention to provide cooler exhaust gas to the intake manifold for recirculation.

It is a further object of the system to significantly decrease, if not altogether eliminate, buildup of soot existing in the exhaust gas on the engine air side of the aftercooler of the engine.

It is a further object to keep such soot from entering the power cylinder and lubricating oil of the engine.

These objects as well as others are met by the system of the present invention wherein a catalyzed particulate filter, or trap as it is commonly referred to, is inserted in the EGR flow path upstream of the aftercooler and an electronically controlled flow diverter valve is employed to control the amount of EGR flow that is to be cooled. At EGR flow temperatures below approximately 700° F., uncooled exhaust gas flow is routed directly to the engine's intake manifold. At EGR temperatures above 700° F., the EGR flow is modulated to provide a desired intake manifold temperature with flow to be cooled being directed through the catalyzed filter where oxidation of the soot in the recirculated exhaust gas occurs. This oxidation occurs naturally and without the need for any type of external regeneration system. The cleaned exhaust gas flow to be recirculated then continues on to the aftercooler where it, along with the remainder of the air intake charge, is mixed and cooled prior to being ingested by the engine.

An additional benefit produced by this system is that soot which might have entered the power cylinder and promoted bore wear therein as well as might have entered the lube oil from the cylinder wall to accelerate wear of other engine components, is greatly reduced.

BRIEF DESCRIPTION OF TEE DRAWINGS

DESCRIPTION OF THE PREFERRED EMBODIMENT

Figure 1:
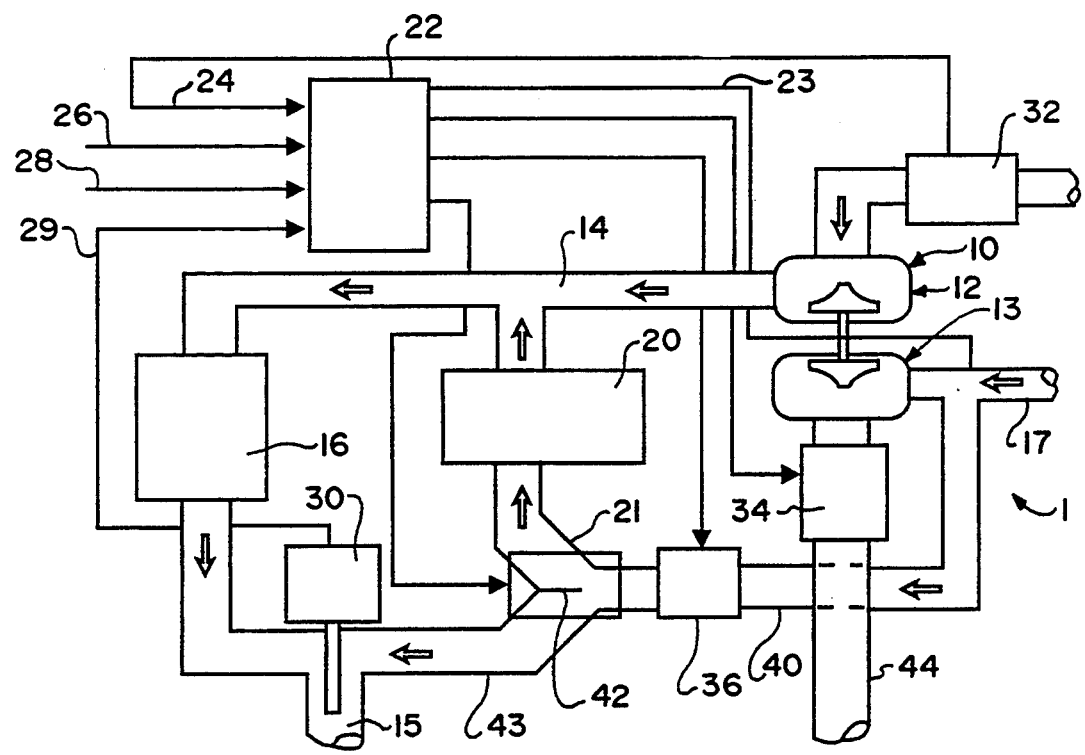
FIG. 1 is a schematic block diagram of a portion of a diesel engine incorporating the EGR system with exhaust gas conditioning of the present invention.

Referring now to FIG. 1 in greater detail, there is illustrated therein a portion of a diesel engine generally identified by the reference numeral 10 incorporating an exhaust gas recirculation system with exhaust gas conditioning generally identified by the reference numeral 11 made in accordance with the teachings of the present invention.

As is known, pressurized engine intake air is obtained from an engine-mounted turbocharger compressor 12 powered from the engine exhaust manifold 17 by an exhaust gas turbine 13 and is carried to the engine cylinders (not shown) by an air intake system 14 to an engine intake manifold 15. Exhaust gas produced in the cylinders upon combustion carries chemical constituents and soot which are preferably removed from exhaust gas channelled through the aftercooler to the intake manifold 15. The amount of exhaust gas to be recirculated is controlled by an exhaust gas recirculation system of the engine. Here, a predetermined portion of the exhaust gas exiting the engine is reintroduced into the engine intake manifold 15, along with the fresh intake air from the compressor 12 via supply line 14, and is combusted a second time, in an attempt to reduce in-cylinder NOx generation.

However, such recirculated exhaust gas is very hot, often at temperatures over 700° F. Such high temperatures would increase the intake manifold temperature beyond the desirable upper limit of 300° F. beyond which the likelihood of an engine experiencing power cylinder problems increases dramatically.

In an attempt to maintain intake manifold temperature at an optimum level, aftercoolers or intercoolers 16, either of the air-to-air or air-to-water type, have been incorporated in the engine in combination with the EGR system. An aftercooler 16, however, has a tendency to become fouled by the deposition of soot from the recirculated exhaust gas onto the engine air side heat transfer surface, decreasing cooling efficiency. Moreover, such soot buildup also restricts air flow through the system, further compromising efficiency.

As shown, the EGR system 11 is operable under the control of an electronic engine control unit (ECU) 22, which may also control other engine functions, in response to various input parameters normally monitored for exhaust gas recirculation control, such as exhaust manifold temperature 23, mass air flow 24 from a conventional mass air flow sensor 32, engine speed 26, pedal position 28, and intake manifold temperature 29 from temperature sensor 30 being monitored for activation and control of exhaust gas conditioning and cooling requirements.

Still further, the ECU 22 is known to control a plurality of valves in the system 10. One such valve 34 enables, as necessary, an exhaust back pressure control which increases and decreases exhaust back pressure as necessary. The valve 34, described in U.S. Pat. No. 5,079,921, is presently used to increase back pressure during engine warmup, thereafter remaining fairly idle. An EGR control valve 36 fluidly connected to the exhaust manifold 17 by line 40 enables, as necessary, recirculation of the exhaust gas through the system and in a manner similar to the valve 34, can be controlled by the ECU 22 to occupy a variety of positions, to produce a modulated flow therethrough.

Immediately downstream of EGR valve 36 in the line 40 is a flow diverter valve 42 which modulates the proportion of exhaust gas which is directed through line 21 to the aftercooler 16 to be cooled prior to introduction into the intake manifold 15, the modulation being controlled by the ECU 22 primarily in response to the temperature sensed in the intake manifold 15 by sensor 30. Alternatively, the diverter valve directs exhaust gas through line 43 to intake manifold 15.

As stated above, creation and collection of soot on surfaces within and along the cooling path decreases efficiency of the aftercooler 16. In accordance with the invention, the EGR system 11 is provided with an exhaust gas conditioner 20 to optimize efficiency of the aftercooler by virtually eliminating soot buildup on the aftercooler 16. The exhaust gas conditioner 20 comprises a self-regenerating catalyzed particulate filter 20 inserted into the exhaust gas flow path 21 between the diverter valve 42 and the intake air path 14 upstream of the aftercooler 16. The self-regenerating catalyzed filter 20, acts to oxidize any soot in the exhaust gas flow to be cooled prior to the exhaust gas reaching the aftercooler 16. Oxidation occurs naturally within the filter 20, a catalyst therein creating a chemical environment which lowers the temperature at which the soot may be vaporized to approximately 700° F., well within the normal operating engine temperature range. Exhaust gas leaving the filter 20 typically has 90% or more of the soot removed therefrom. The filter 20 is similar to a larger size catalyzed filter manufactured by the Engelhard Corp. of Iselin, N.J. and sold under the trademark "DPX" for use in mining and construction equipment applications.

Since the minimum temperature at which soot will be vaporized by the filter 20 is 700° F. and since it would be undesirable to plug the filter 20 with unvaporized soot, the diverter valve is also controlled by the ECU 22 in response to the exhaust manifold temperature signal 23 so that at exhaust manifold temperatures below 700° F., the diverter valve 42 will route uncooled exhaust gases directly through line 43 to the engine's intake manifold 15 while, at exhaust manifold temperatures above 700° F., exhaust gas flow is modulated by diverter valve 42 through line 21 to the filter 20 and aftercooler 16 based on the intake manifold temperature 29 in the manner described hereafter.

Figure 2:
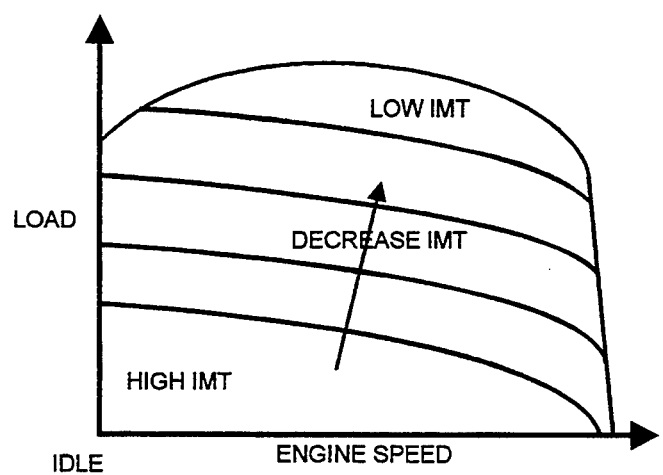
FIG. 2 is a graph showing intake manifold temperature in relation to engine speed and load achieved when using this invention.

In FIG. 2, there is shown therein a map of intake manifold temperature relative to engine speed and load which the ECU 22 follows to modulate the EGR system. It is desirable for purposes of controlling emissions, such as the soluble organic fraction portion of particulates, to run at a higher intake manifold temperature of about 300° F. at idle while operating at a much lower intake manifold temperature of about 120° F. under maximum load and speed, to improve combustion efficiency while reducing NOx. Consequently, at idle, all recirculated exhaust gas is fed directly to the intake manifold 15 to thereby generate a high temperature. As engine speed and load increase, the desired intake manifold temperature decreases and thus an increasingly significant portion of the recirculated exhaust gas is directed by the diverter valve 42 to the particulate filter 20 and aftercooler 16, until all the recirculated exhaust gas is being cooled.

Figure 3:
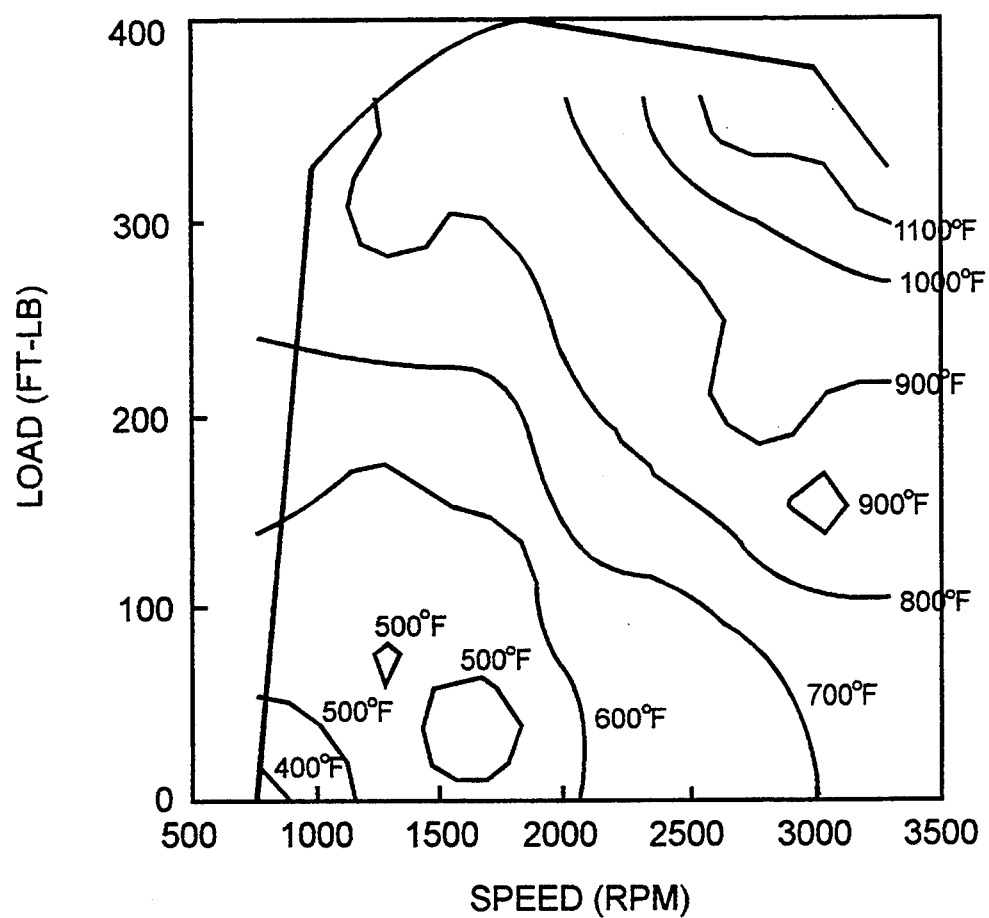
FIG. 3 is a graphic representation of exhaust temperature in relation to engine speed and load.

From FIG. 3, it will be seen that exhaust manifold temperatures increase with increases in load and/or speed. In view of the location of the 700° F. line, it will be understood that under normal operating conditions, a considerable amount of the exhaust gas to be recirculated will require cooling prior, to entry into the intake manifold 15. By removing the particulate matter from the recirculated exhaust gas the cooling efficiency of the aftercooler 16 will be maintained and the deposition of soot in the cooling pathway significantly decreased, if not altogether eliminated.

As will be understood from FIG. 1, only a portion of the exhaust gas created through combustion is routed back into the intake manifold 15 of the engine for recirculation, with a much greater portion being exhausted through the exhaust pipe 44, especially at higher speeds and loads. At times, it may be desired to increase the amount of recirculated exhaust gas being fed into the line 14, for example, to raise the exhaust gas temperature of 700° F. and thus enable operation of the filter 20. When such increase is desired, the exhaust back pressure control valve 34 may be brought into play. In this respect, the valve 34 may be activated to restrict exhaust gas passage therethrough, thereby increasing the amount of exhaust gas being shunted into the exhaust gas recirculation system 10. Inasmuch as the exhaust back pressure control valve 34 remains fairly idle after engine startup, the use thereof to increase exhaust gas flow into the system 11 does not compromise its primary function.

As described above, the EGR system of the present invention has a number of advantages, some of which have been described above and others which are inherent in the invention. Also, those of ordinary skill in the art, upon a perusal of the foregoing description, will recognize that various modifications maybe made to the EGR system without departing from the invention. For example, although taught herein in connection with the preferred embodiment because it can provide an additional function, the exhaust back pressure control valve 34 is not necessary for the operation of the basic EGR system of the invention. Accordingly, the scope of the invention is only to be limited as necessitated by the accompanying claims.

What is claimed is:

1. An exhaust gas recirculation system for a supercharged diesel engine of the type having an aftercooler operatively disposed between a supercharging device and an intake manifold of said engine comprising an exhaust gas recirculation means selectively operable to feed exhaust gases from said engine directly to said intake manifold, said exhaust gas recirculation means including selectively operable communication means for communicating a portion of said exhaust gases from said exhaust gas recirculation means to said aftercooler, and a conditioning device operatively disposed in said communication means to remove diesel particulate matter from exhaust gas communicated to the aftercooler.

2. The system of claim 1 wherein said conditioning device comprises a self-regenerating catalyzed particulate filter.

3. The system of claim 2 wherein said catalyzed particulate filter has a lower operating temperature limit for vaporizing soot within a range of normal operating temperatures of a diesel engine.

4. The system of claim 3 wherein said lower soot vaporization limit occurs at approximately 700° F.

5. The system of claim 1 further including an exhaust back pressure control device of the engine selectively operable to increase the amount of exhaust gas fed into the exhaust gas recirculation means.

6. In an exhaust gas recirculation system for a supercharged diesel engine of the type having an aftercooler operatively disposed between a supercharging device and an intake manifold of said engine and an exhaust gas recirculation means selectively operable to feed exhaust gases from said engine to said intake manifold, said exhaust gas recirculation means including selectively operable communication means for communicating a portion of said exhaust gases from said exhaust gas recirculation means to said aftercooler, the improvement comprising a self-regenerating catalyzed particulate filter operatively disposed in said communication means to remove diesel particulate matter from exhaust gas communicated to the aftercooler, said catalyze particulate filter having a lower operating temperature limit for vaporizing soot within a range of normal operating temperatures of a diesel engine, and valve means for selectively allowing modulated entry of recirculated exhaust gas to said communication means in response to a predetermined intake manifold temperature.

7. The system of claim 6 and said predetermined intake manifold temperature being selected by an electronic control means from a programmed map of desired intake manifold temperature is depending on engine speed and load.

8. The system of claim 6 wherein said valve means for allowing modulated entry of recirculated exhaust gas to said communication means is selectively controlled to permit entry of recirculated exhaust gas to said filter only upon said exhaust temperature exceeding said lower operating temperature limit of said filter.

9. The system for claim 6 wherein exhaust gas flow having a temperature less than said lower operating temperature limit of said filter is shunted directly to an intake manifold of the diesel engine by said valve means.

10. In combination with an electronically-controlled diesel engine having an engine control unit, an intake manifold, an exhaust manifold, a turbocharger having a turbine operatively connected to said exhaust manifold and a compressor operatively connected to said intake manifold, and an aftercooler fluidly connected between said compressor and said intake manifold, an exhaust gas recirculation system having selectively controlled fluid communication means for directing exhaust gas from said exhaust manifold through said aftercooler to said intake manifold comprising:

a catalyzed particulate filter fluidly connected between said exhaust manifold and said aftercooler and a passage for directing exhaust gas to said intake manifold independently of said aftercooler and a selectively-controlled diverter valve disposed to control the proportion of exhaust gas directed to said aftercooler based on a desired intake manifold temperature selected from a range of temperatures dependent on engine speed and load stored in said engine control unit.

11. The system of claim 10 and said catalyzed particulate filter having a minimum operating temperature for vaporizing soot, and said diverter valve being selectively controlled to direct exhaust gas to said filter only upon said exhaust gas exceeding said minimum operating temperature.

12. The system of claim 10 and said fluid communication means further comprising a passage for directing exhaust gas to said intake manifold independently of said aftercooler and a selectively-controlled diverter valve disposed to control the proportion of exhaust gas directed to said aftercooler, said catalyzed particulate filter having a minimum operating temperature for vaporizing soot, and said diverter valve being controlled to direct exhaust gas to said filter only upon said exhaust gas exceeding said minimum operating temperature.

* * * * *